United States Patent
Redmon et al.

(10) Patent No.: US 10,461,462 B2
(45) Date of Patent: Oct. 29, 2019

(54) ELECTRONICS CHARGING BLOCK HAVING DETACHABLE TENTACLES

(71) Applicants: Adam Redmon, Waynesville, NC (US); Hannah Redmon, Waynesville, NC (US)

(72) Inventors: Adam Redmon, Waynesville, NC (US); Hannah Redmon, Waynesville, NC (US)

( * ) Notice: Subject to any disclaimer, the term of this patent is extended or adjusted under 35 U.S.C. 154(b) by 0 days.

(21) Appl. No.: 16/015,931

(22) Filed: Jun. 22, 2018

(65) Prior Publication Data

US 2019/0097347 A1 Mar. 28, 2019

Related U.S. Application Data

(60) Provisional application No. 62/561,741, filed on Sep. 22, 2017.

(51) Int. Cl.
*H01R 13/516* (2006.01)
*H02J 7/00* (2006.01)
*H01R 31/06* (2006.01)

(52) U.S. Cl.
CPC .......... *H01R 13/516* (2013.01); *H01R 31/06* (2013.01); *H02J 7/0042* (2013.01); *H01R 31/065* (2013.01)

(58) Field of Classification Search
CPC ...... H01R 13/516; H01R 31/06; H02J 7/0042
See application file for complete search history.

(56) References Cited

U.S. PATENT DOCUMENTS

| 5,397,243 A | * | 3/1995 | MacMurdo, Sr. | H01B 7/24 174/135 |
| 9,362,674 B1 | * | 6/2016 | Don | H01R 13/6392 |
| 9,866,044 B1 | * | 1/2018 | Bell | H02J 7/0042 |
| 2009/0115367 A1 | * | 5/2009 | Kidakam | H02J 7/0042 320/101 |
| 2011/0009003 A1 | * | 1/2011 | Youssefi-Shams | H01R 13/44 439/628 |
| 2012/0289081 A1 | * | 11/2012 | Izzard | H01R 25/003 439/535 |
| 2013/0330965 A1 | * | 12/2013 | Hildebrandt | H01R 13/00 439/559 |
| 2014/0036485 A1 | * | 2/2014 | Parsons | F21L 4/005 362/183 |
| 2014/0103179 A1 | * | 4/2014 | Lipke | H02G 3/14 248/231.91 |
| 2014/0263869 A1 | * | 9/2014 | Clark-Mantle | H01R 13/72 248/65 |
| 2015/0018049 A1 | * | 1/2015 | Baschnagel | H04M 1/04 455/573 |
| 2015/0028797 A1 | * | 1/2015 | Miller | H02J 7/0042 320/103 |

(Continued)

*Primary Examiner* — Truc T Nguyen
(74) *Attorney, Agent, or Firm* — Chambliss, Bahner & Stophel, P.C.

(57) ABSTRACT

An electronics charging block system having a body with a plug configured to connect to an electrical outlet. A bendable utility tentacle is configured to mount to the body and includes an arm portion. An insertion tip is formed at a first end of the arm portion. A tentacle-receiving socket is found in the body, and the insertion tip is configured for removable insertion into the tentacle-receiving socket. The system further includes an electrical interface for enabling an electrical connection to be formed between the charging block and an external electronic device.

19 Claims, 7 Drawing Sheets

(56) References Cited

U.S. PATENT DOCUMENTS

| | | | |
|---|---|---|---|
| 2015/0380877 A1* | 12/2015 | McRae | H01R 13/68 |
| | | | 439/106 |
| 2016/0091196 A1* | 3/2016 | Chien | F21V 33/0048 |
| | | | 362/253 |
| 2016/0233703 A1* | 8/2016 | Miller | H02J 7/0042 |
| 2017/0353591 A1* | 12/2017 | Abramovich | H01R 31/06 |
| 2018/0102655 A1* | 4/2018 | Miller | H05B 37/0281 |
| 2018/0166894 A1* | 6/2018 | Miller | G06F 1/266 |
| 2019/0006793 A1* | 1/2019 | Watkins, Jr. | H01R 13/6395 |

* cited by examiner

ELECTRONICS CHARGING BLOCK HAVING DETACHABLE TENTACLES

CROSS-REFERENCE TO RELATED APPLICATIONS

This application claims the benefit of U.S. Provisional Patent Application No. 62/561,741, filed on Sep. 22, 2017 and entitled ELECTRONICS CHARGING BLOCK HAVING DETACHABLE ARMS, which is incorporated herein by reference in its entirety.

FIELD OF THE INVENTION

The invention relates generally to charging blocks for electronics. More particularly, the present invention relates to a customizable charging block having detachable multi-function tentacles and a decorative outer shell.

BACKGROUND OF THE INVENTION

Current electronics chargers and charging block designs, such as USB wall chargers, are largely similar in shape and style and provide few or no options for user customization. Such customization is useful not only for the user's own gratification but also for identification and other purposes. What is needed, therefore, is a user customizable electronics charging block.

NOTES ON CONSTRUCTION

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

SUMMARY OF THE INVENTION

The above and other needs are met by an electronics charging block that includes a body having a plug configured to connect to an electrical outlet and a bendable utility tentacle that is configured to mount to the body. A tentacle-receiving socket is formed in the body. Each tentacle includes an arm portion and an insertion tip that is formed at a first end of the arm portion. The insertion tip is configured for removable insertion into the tentacle-receiving socket. An electrical interface enables an electrical connection to be formed between the charging block and an external electronic device, such as a mobile phone.

In certain preferred embodiments, a removable shell substantially covers an exterior of the body. The shell includes a body-receiving opening for enabling the body to be inserted into the shell. The shell may also include a tentacle-receiving opening. The insertion tip of the bendable tentacle is sized and configured to be inserted through the tentacle-receiving opening of the shell and then into the tentacle-receiving socket of the body when the body is within the shell. In some cases, the shell further includes a plug opening and the plug is sized and configured to extend out of the shell through the plug opening for connecting to the electrical outlet. In some cases, the body-receiving opening is pliant and can be expanded. In those cases, the body-receiving opening must be expanded in order for the body to be inserted into and removed from the shell.

In certain cases, two bendable tentacles are provided and each is configured to mount to the body and each has an insertion tip formed at a first end thereof. The insertion tips enable the tentacles to be removably inserted into one of two separate tentacle-receiving sockets formed in the body. The bendable tentacle may be removably mounted together with the body by a friction interaction between the insertion tip and the tentacle-receiving socket. In some cases, the bendable tentacle may be magnetically mounted to the body. In some cases, the tentacle is frictionally mounted to the body by inserting the insertion tip into the tentacle-receiving socket. In certain embodiments, friction-increasing grooves are formed on an external surface of the insertion tip for increasing friction between the insertion tip and the tentacle-receiving socket. In some alternative embodiments, the insertion tip includes a pair of prongs that may be inserted into a corresponding pair of slots formed in the tentacle-receiving socket and then turned in order to lock the prongs within the slots for removably mounting the bendable tentacle to the body. In certain preferred embodiments, the body has a plurality of face surfaces the tentacle-receiving sockets are disposed on separate face surfaces. In other cases, the tentacle-receiving sockets are disposed on the same face surface.

In some embodiments, the electrical interface is a charging cord that may be electrically connected to the plug and that has an end configured to electrically connect the charging block to the electronic device. In other embodiments, the electrical interface is a port configured to receive a charging cord and to provide an electrical connection between the charging cord and the plug. In some cases, two electrical interfaces are provided. Each electrical interface enables an electrical connection to be formed between the charging block and an external electronic device.

BRIEF DESCRIPTION OF THE DRAWINGS

The presently preferred embodiments of the invention are illustrated in the accompanying drawings, in which like reference numerals represent like parts throughout, and in which.

Figure 1:
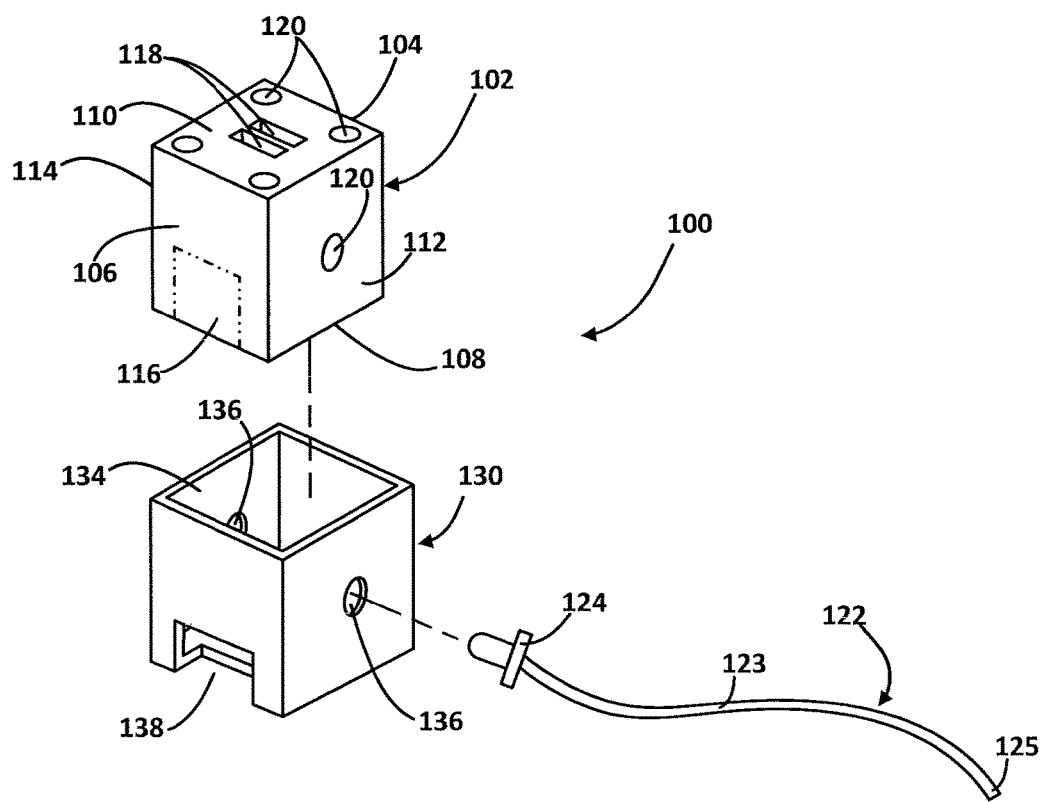
FIG. 1 is a perspective view depicting an electronics charging block, removable shell and bendable utility tentacle according to an embodiment of the present invention.

DESCRIPTION OF THE PREFERRED
EMBODIMENTS OF THE INVENTION

This description of the preferred embodiments of the invention is intended to be read in connection with the accompanying drawings, which are to be considered part of the entire written description of this invention. The drawings are not necessarily to scale, and certain features of the invention may be shown exaggerated in scale or in somewhat schematic form in the interest of clarity and conciseness.

Referring now to FIGS. 1-8, there is provided an electronics charging block system 100 according to an embodiment of the present invention. In this particular view, the charging block system 100 is being shown in a bottom-up orientation. The system includes a body 102, which, in this particular cases, is cuboid in shape and includes front 104, rear 106, top 108, bottom 110, left 112, and right outer surfaces 114. In this embodiment, the cube-shaped body 102 measures approximately 1½ inches tall, 1½ inches wide, and 1½ inches deep. These dimensions are provided merely as an example and are not limiting. Preferably, when the body 102 is viewed from the front, the front edge and the side edges are smooth and rounded. Likewise, the top surface and top edges are also smooth and rounded.

Figure 3:
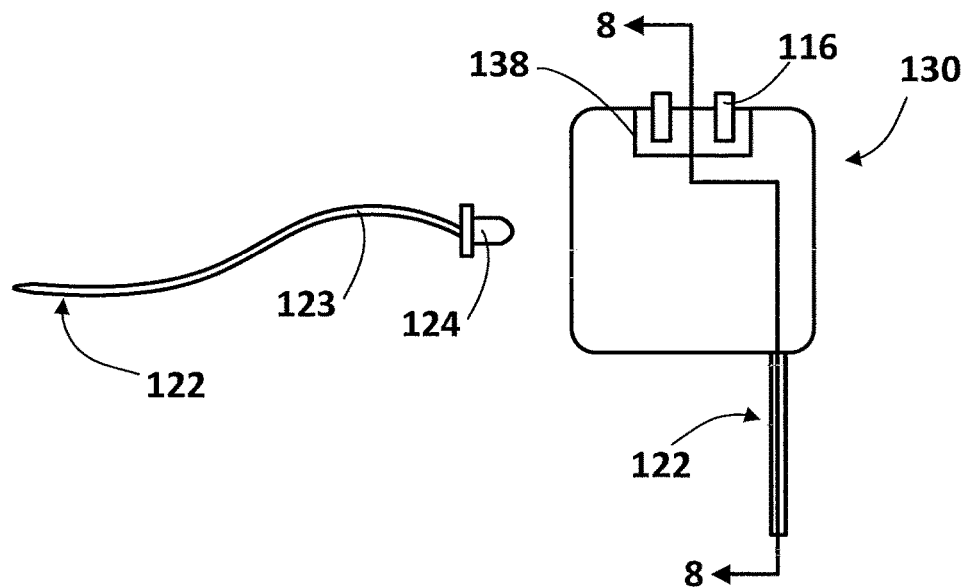
FIG. 3 is a top plan view depicting an electronics charging block, removable shell and bendable utility tentacle according to an embodiment of the present invention.
Figure 4:
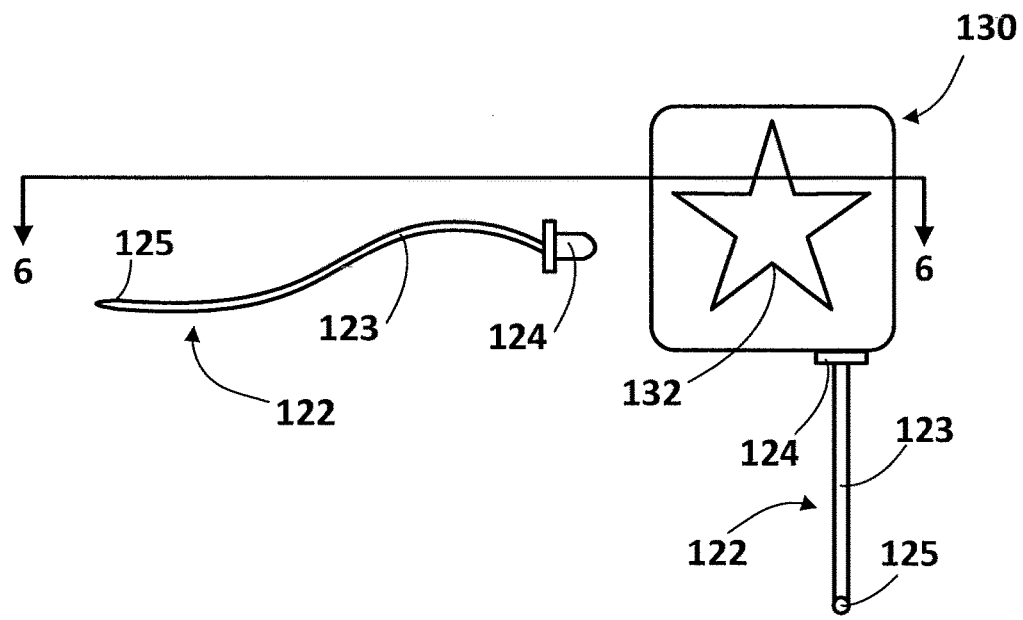
FIG. 4 is a front elevation view depicting the electronics charging block, removable shell and bendable utility tentacle of FIG. 3.
Figure 5:
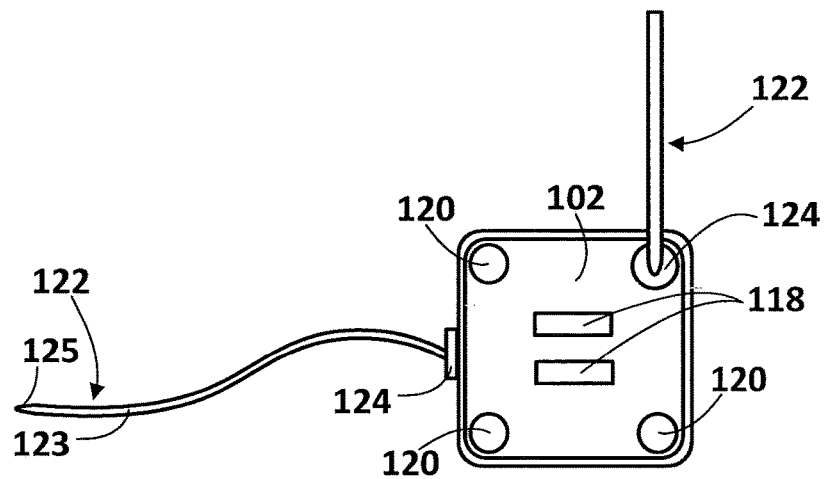
FIG. 5 is a bottom plan view depicting the electronics charging block, removable shell and bendable utility tentacle of FIG. 3.
Figure 6:
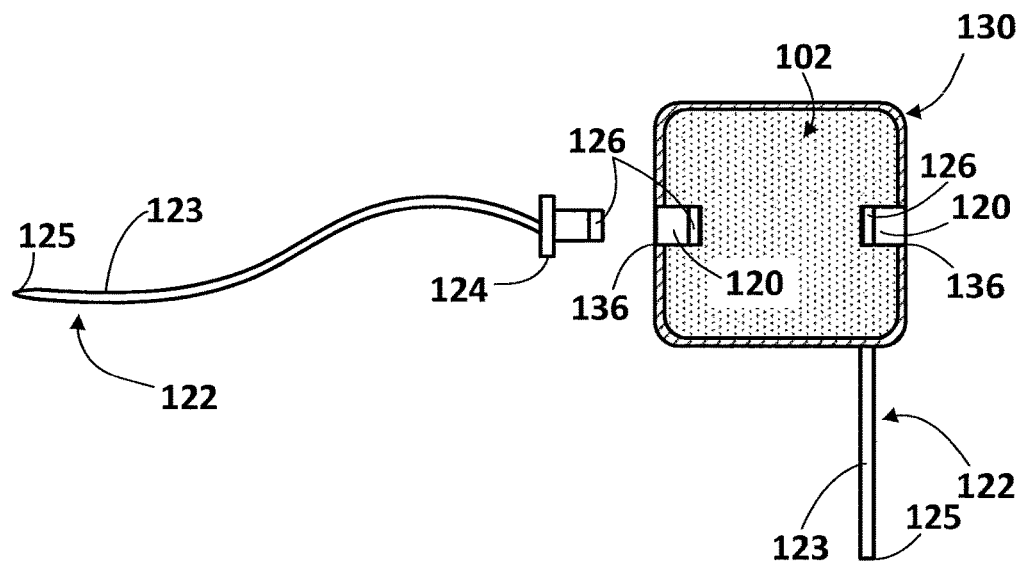
FIG. 6 is a sectional view taken along line 6-6 in FIG. 4.
Figure 7:
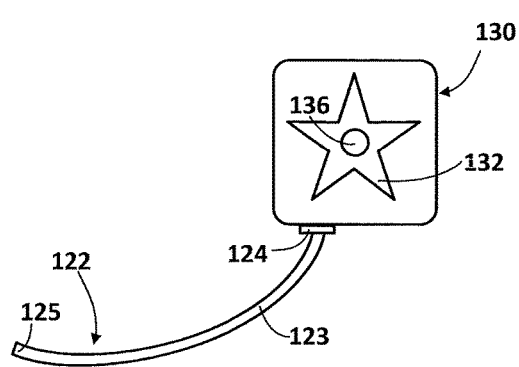
FIG. 7 is a right-side elevation view depicting the electronics charging block, removable shell and bendable utility tentacle of FIG. 3.
Figure 8:
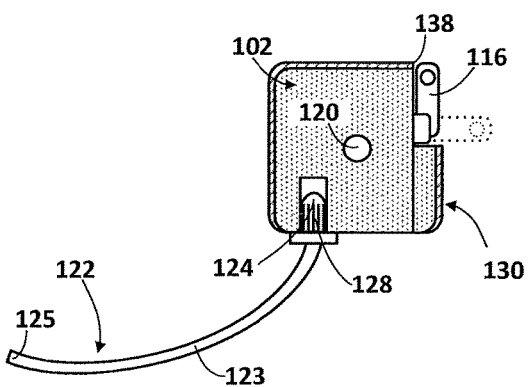
FIG. 8 is a sectional view taken along line 8-8 in FIG. 3.

Body 102 functions like a typical charging block for electronics. A plug 116 is disposed on the rear outer surface 106 of the body and is configured to connect to an electrical outlet, such as a wall outlet. The plug 116 is represented generically as a box using broken lines (in FIG. 1) because any type of electrical plug (e.g., Type A, Type B) could be used with the system 100. A Type A plug is shown in FIGS. 3 and 8. A ¾ inch wide indention is provided on the top-rear edge of the body 102, which indentation provides space for the plug 116 to be folded upwards and stored when not needed. In the stored position, the prongs are folded upwards to an upright position extending along the back surface 106 of the body 102. When needed, the prongs may be folded downwards and may be inserted into the electrical outlet.

An electrical interface 118 is positioned in the front outer surface 110 of the body 102 for enabling an electrical connection to be created when the plug 116 is inserted into an outlet. It should be noted that the electrical interface 118 could be moved to other surfaces other than the front outer surface 110. In this particular case, electrical interface 118 is a port opening (and associated internal circuitry that is well known in the art and, for that reason, is not shown or described here) that is sized and configured to receive an electrical cable, such as a USB-type cable, which cable could then be used for charging an external electronic device. In other cases, the electrical interface 118 may be a charging cable or charging dock that is formed as part of the body 102 and is in electrical communication with the plug 116.

Unlike a typical charging block, the body 102 includes one or more tentacle-receiving sockets 120 that extend into the body. In this particular case, a single socket 120 having a diameter of approximately ¼ inch is formed in each of the left and right outer surfaces 112, 114. Four additional tentacle-receiving sockets 120 are formed in the bottom outer surface 110 of the body 102. While only one socket 120 is provided in each side in this particular embodiment, additional sockets may be provided on either side surface 112, 114 or on any other surface of the body 102.

Figure 10:
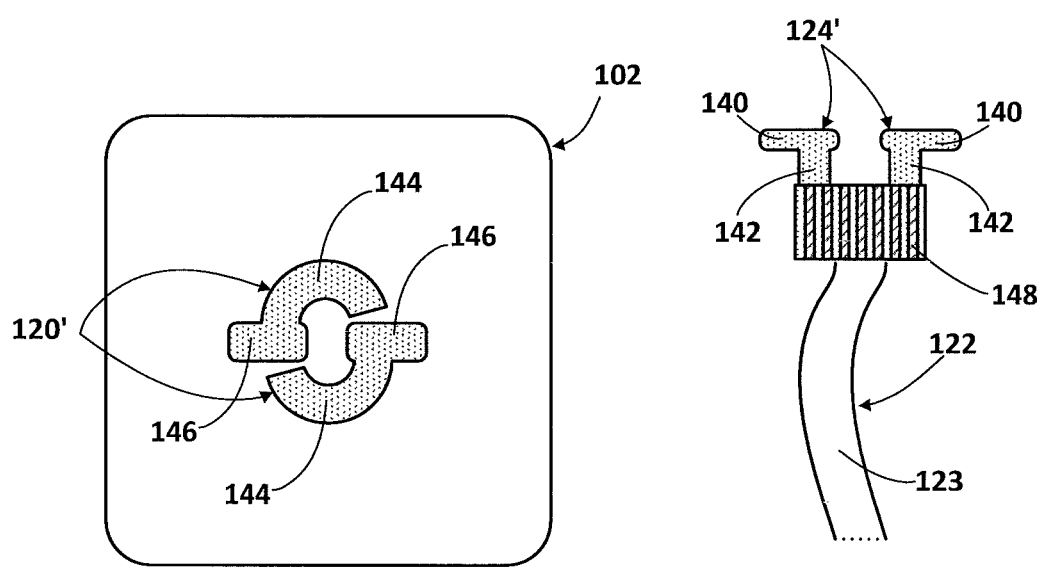
FIG. 10 depicts an electronics charging block and bendable utility tentacle according to an alternative embodiment of the present invention.

Bendable utility tentacles 122 are configured to mount to the body 102 by being interchangeably inserted into any one of the tentacle-receiving sockets 120 and retained therein. Each tentacle 122 includes a bendable arm 123 and an insertion tip 124 that is formed at a first end of each of the bendable arms. The insertion tip 122 is configured for removable insertion into the tentacle-receiving sockets 120. In this case, each tentacle 122 is provided with a rounded plug-type insertion tip 124 that is inserted into the corresponding round sockets 120. However, in other embodiments, insertion tip 124 and socket 120 may be formed in other non-round shapes. For example, with reference to FIG. 10, there is provided an alternative form of a tentacle-receiving socket 120' and insertion tip 124' that may be used to provide a "twist to lock" mechanical connection between the body 102 and the tentacle 122. Alternative insertion tip 124' is provided with attachment prongs 140, which are somewhat L-shaped and have a vertical portion 142 joined to a lateral portion 144. The attachment prongs 140 are received in the pair of mounting slots 120' located in the body 102. Mounting slots 120' include a semi-circular portion 144 and a straight portion 146 disposed at an end of portion 144. When the prongs 140' are inserted into the slot 120', the lateral portion 144 of the prong is inserted into the straight portion 146 of the slot. To lock the tentacle 122 in place, the tentacle is rotated clockwise. Rotating the tentacle 122 causes the vertical portion 142 of the prong 140 to travel along the narrow semi-circular portion 144 of the slot 120'. The narrow semi-circular section 144 of the slot 120' is sized to retain the laterally extending section 144 of the attachment prongs 140 and to prevent them from being inadvertently removed from the slots. In certain preferred embodiments, to facilitate the twisting of the insertion tip 124', friction-increasing grooves 148 may be placed on an external surface of the insertion tip to provide a better gripping surface for the user.

A number of other removable mounting methods may be used to secure the tentacle 122 to the socket 120. In some embodiments, the insertion tip 124 is magnetically held within the socket 120. For example, as shown best in FIG. 6, a pair of corresponding permanent magnets 126 may be placed in the socket 120 of the body 102 and on the tip 124. In other embodiments, the insertion tip 124 is frictionally held within socket 120. For example, the insertion tip 124 may be formed using a somewhat compressible material, such rubber, silicone, foam, etc. that could be compressed and inserted into the socket 120. Additionally, as shown in FIG. 8, the insertion tip 124 may be provided with a friction-increasing surface feature 128, such as grooves, for assisting in providing a more secure connection between the insertion tip and the socket 120. Regardless of the connection method used, it is important that the connection is secure enough to prevent the tentacle 122 from being inadvertently pulled from the socket 120 when the tentacle is maneuvered, but also not overly difficult when a user intends to remove the tentacle from the socket.

Figure 9:
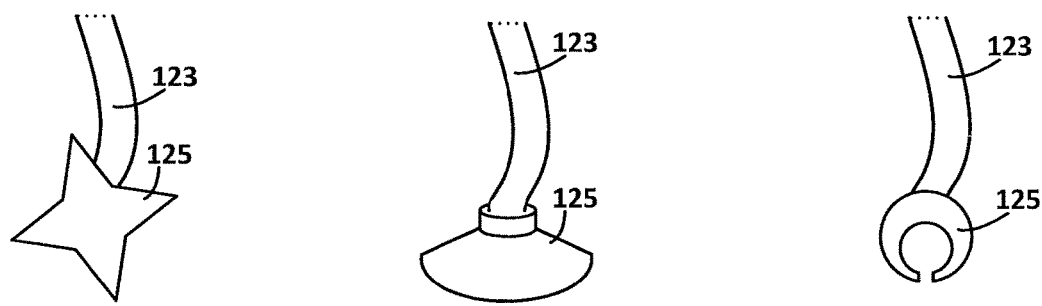
FIG. 9 depicts three alternative insertion tips mounted to a bendable tentacle.

Returning to FIG. 1-8, once mounted to the body 102, the tentacles 122 may be used for a variety of utilitarian purposes, including holding an electronic device or charging cord, stabilizing the body 102, etc. The bendable tentacles 122 should be easily maneuverable but should retain their position. This may be accomplished, for example, by forming the arms 123 using a shape-retaining deformable material (e.g., a thin metallic rod) covered in a protective cover, such as those disclosed in U.S. Pat. No. 8,806,723B2 to Martinson et al. and entitled "Tie Wrap for Bundling Objects." In some cases, a basic tip end 125 is provided opposite the plug end 124. In other cases, as an alternative to the basic tip end, a more utilitarian tip is provided on the end of the tentacle 122 opposite the plug end 124. For example, as shown in FIG. 9, tentacles 122 may be provided with a "stabilizer" end (shown at the far left) having a larger surface area in the shape of a disk, star, etc. for contacting items secured to or positioned near the charging block system 100. In other cases, a tip end 125 having "pincer"-type prongs (shown at center) that may be repositioned may be located at the end of the arm 123. Alternatively, a suction cup-type tip end 125 (shown at far right) may be located on the arm 123. The arms depicted are approximately 3 inches in length. However, longer or shorter arms may be utilized depending on the needs of their application.

Figure 2:
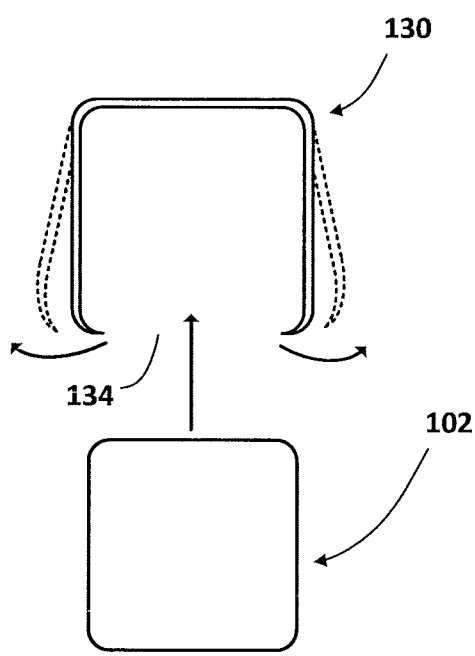
FIG. 2 is a sectional view depicting a pliant body-receiving opening of a shell being expanded to enable a body to be inserted into the shell.

Certain embodiments of the system 100 also include a removable shell 130 for sliding onto and substantially covering an exterior of the body 102. The shell 130 not only protects the body but also enables the body to be customized with surface decorations 132, which may be selected by a user. Each shell 130 is provided with a body-receiving opening 134 for enabling the body 102 to be inserted into the shell. Preferably, the body-receiving opening 134 is sized smaller than the body 102 and is pliant so that it can be expanded. Preferably, in order to insert the body 102 into the shell 130 or to remove the body from the shell, opening 134 must be stretched outwards, as illustrated in FIG. 2. One advantage of this design is that it ensures that the body 102 does not inadvertently slide out of the shell 130. The shell 130 also includes tentacle-receiving openings 136 that are located so that they align with a socket 120 when the shell is positioned over body 102. The insertion tip 124 of the bendable tentacle 122 is preferably sized and configured to be inserted through both the tentacle-receiving opening 136 of the shell 130 and then into the tentacle-receiving socket 120 of the body 102 when the body is within the shell. Lastly, the shell 130 also preferably includes a plug opening 138 that is located to align with the plug 116 when the shell is positioned over the body 102. The plug opening 138 is sized and configured to enable the plug 116 to extend out of the shell through the plug opening for connecting to the electrical outlet. As shown best in FIG. 8, the plug opening 138 also preferably allows a plug 116 to be moved between stored and use positions.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

What is claimed is:

1. An electronics charging block system comprising:
   a body having a plug configured to connect to an electrical outlet;
   a tentacle-receiving socket formed in the body that is not in electrical communication with the plug;
   a utility tentacle configured to mount to the body and having a shape-retaining bendable arm portion configured to contact an external electronic device and an insertion tip formed at a first end of the arm portion, the insertion tip configured for removable insertion into the tentacle-receiving socket; and
   an electrical interface for enabling an electrical connection to be formed between the charging block and the external electronic device, wherein the utility tentacle does not form part of an electrical connection.

2. The system of claim 1 further comprising a removable shell for substantially covering an exterior of the body, the shell having a body-receiving opening for enabling the body to be inserted into the shell.

3. The system of claim 2 wherein the shell further comprises a tentacle-receiving opening and wherein the insertion tip of the bendable tentacle is sized and configured to be inserted through the tentacle-receiving opening of the shell and then into the tentacle-receiving socket of the body when the body is within the shell.

4. The system of claim 2 wherein the shell further comprises a plug opening and wherein the plug is sized and configured to extend out of the shell through the plug opening for connecting to the electrical outlet.

5. The system of claim 2 wherein the body-receiving opening is pliant and can be expanded, and wherein the body-receiving opening must be expanded in order for the body to be inserted into and removed from the shell.

6. The system of claim 1 comprising two bendable tentacles that are each configured to mount to the body, wherein each tentacle has an insertion tip formed at a first end thereof that is configured for removable insertion into one of two separate tentacle-receiving sockets formed in the body.

7. The system of claim 1 wherein the body has a plurality of face surfaces and wherein the tentacle-receiving sockets are disposed on separate face surfaces.

8. The system of claim 1 wherein the body has a plurality of face surfaces and wherein the tentacle-receiving sockets are disposed on the same face surface.

9. The system of claim 1 wherein the electrical interface is a charging cord that is electrically connected to the plug and that has an end configured to electrically connect the charging block to the electronic device.

10. The system of claim 1 wherein the electrical interface is a port configured to receive a charging cord and to provide an electrical connection between the charging cord and the plug.

11. The system of claim 1 comprising two electrical interfaces, each electrical interface for enabling an electrical connection to be formed between the charging block and an external electronic device.

12. The system of claim 1 wherein the bendable tentacle may be magnetically mounted to the body.

13. The system of claim 1 wherein the tentacle is frictionally and removably mounted to the body by inserting the insertion tip into the tentacle-receiving socket.

14. The system of claim 1 wherein friction-increasing grooves are formed on an external surface of the insertion tip for increasing friction between the insertion tip and the tentacle-receiving socket.

15. The system of claim 1 wherein the insertion tip includes a pair of prongs that may be inserted into a corresponding pair of slots formed in the tentacle-receiving socket and then turned in order to lock the prongs within the slots for removably mounting the bendable tentacle to the body.

16. An electronics charging block system comprising:
a cuboid body including front, rear, top, bottom, left and right outer surfaces;
a plug disposed on the rear outer surface of the body configured to connect to an electrical outlet;
tentacle-receiving sockets formed in each of the left and right outer surfaces of the body and that are not in electrical communication with the plug;
a pair of shape-retaining bendable utility tentacles having a first end configured to mount to the body and a second end configured to contact an external electronic device;
an insertion tip formed at the first end of each of the bendable tentacles configured for removable insertion into either of said tentacle-receiving sockets for removably connecting the utility tentacle to the body via the tentacle-receiving socket; and
an electrical interface opening disposed in the front outer surface of the body, the electrical interface opening for receiving a charging cord and to provide an electrical connection between the charging cord and the plug, wherein the utility tentacles do not form part of an electrical connection.

17. The electronics system of claim 16 further comprising:
a removable cuboid shell for substantially covering an exterior of the body and formed by front, rear, top, left and right surfaces;
a downwards-facing body-receiving opening located opposite the top for enabling the body to be inserted into the shell;
tentacle-receiving openings disposed in each of the left and right surfaces, wherein the insertion tip of each bendable tentacle is sized and configured to be inserted through the tentacle-receiving openings of the shell and then into one of said tentacle-receiving sockets of the body when the body is within the shell; and
a plug opening disposed in the rear surface, wherein the plug is sized and configured to extend out of the shell through the plug opening for connecting to the electrical outlet.

18. The electronics system of claim 17 further comprising a tentacle-receiving opening disposed in the front outer surface of the cuboid body.

19. The electronics system of claim 17 wherein the body-receiving opening is pliant and can be expanded, and wherein the body-receiving opening must be expanded in order for the body to be inserted into and removed from the shell.

* * * * *